United States Patent [19]

Teller

[11] 3,995,005
[45] Nov. 30, 1976

[54] TREATMENT OF FLUE GASES CONTAINING BORON COMPOUNDS

[75] Inventor: Aaron Joseph Teller, Westboro, Mass.

[73] Assignee: Teller Environmental Systems, Inc., Worcester, Mass.

[22] Filed: May 23, 1975

[21] Appl. No.: 580,249

Related U.S. Application Data

[63] Continuation-in-part of Ser. No. 463,651, April 25, 1974, Pat. No. 3,969,482.

[52] U.S. Cl. ............................ 423/210; 423/240; 423/242; 423/244; 423/215.5
[51] Int. Cl.² ...................................... B01D 53/34
[58] Field of Search .......... 423/210, 240, 242, 244, 423/241, 215.5, 276–278; 55/71, 68

[56] References Cited
UNITED STATES PATENTS

| | | | |
|---|---|---|---|
| 2,231,309 | 2/1941 | Weber | 423/241 X |
| 2,813,000 | 11/1957 | Quittenton | 423/240 |
| 3,016,285 | 1/1962 | Clifford | 423/240 |
| 3,808,774 | 5/1974 | Teller | 55/68 |
| 3,851,042 | 11/1974 | Minnick | 423/244 |

OTHER PUBLICATIONS

Hein et al., "Scrubbing of Fume From Combustion Cases at Efficiencies up to 99.98%," Chemical Abstracts, vol. 55, 16964 and 16965.

*Primary Examiner*—Earl C. Thomas
*Attorney, Agent, or Firm*—Thompson, Birch, Gauthier & Samuels

[57] ABSTRACT

A process is disclosed for the treatment of flue gases to remove acid gases, boron compounds and particulates.

9 Claims, 1 Drawing Figure

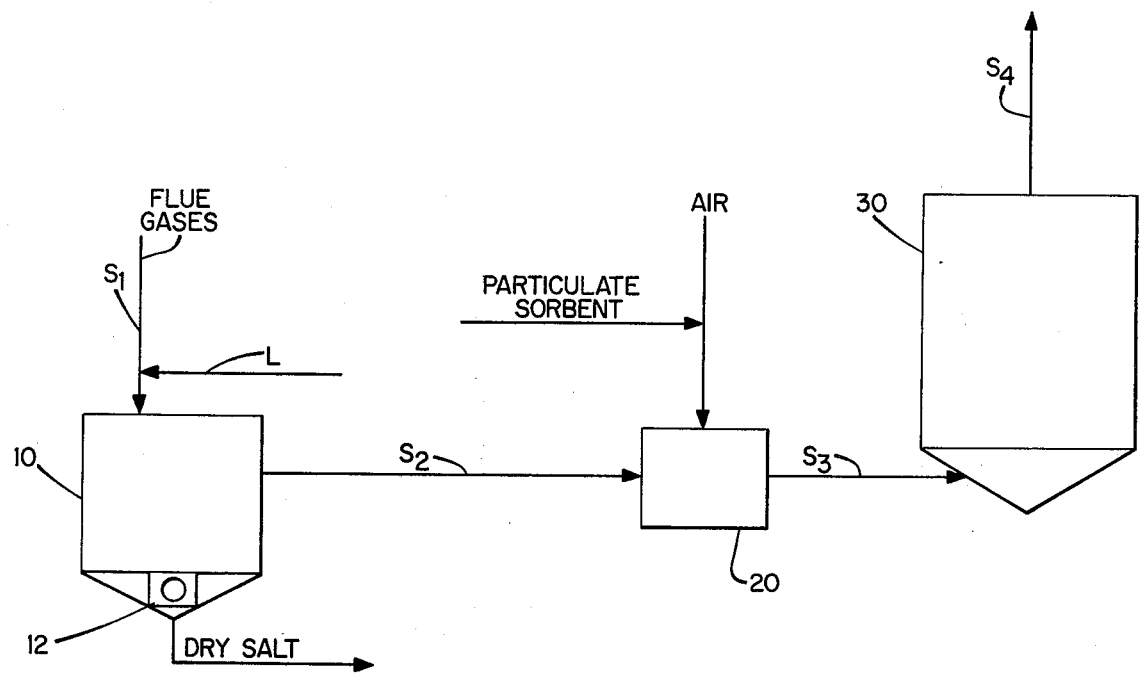

3,995,005

TREATMENT OF FLUE GASES CONTAINING BORON COMPOUNDS

CROSS-REFERENCE TO RELATED APPLICATIONS

This application is a continuation-in-part of U.S. patent application Ser. No. 463,651 filed Apr. 25, 1974 by the same inventor, now U.S. Pat. No. 3,969,482.

BACKGROUND OF THE INVENTION

This invention relates to a two-stage process for the removal of acid gases, boron compounds and particulates from a flue gas. The process is capable of meeting present and proposed emissions requirements.

Flue gases containing a mixture of acid gases, boron compounds and particulates are commonly found, for example, in the effluents from fiberglass melter furnaces. The acid gases in these effluents typically comprise hydrogen fluoride and sulfur oxides. The emitted boron compounds are typically boron oxides ($B_2O_3$).

Prior art processes for treating these effluent gases have been unsuccessful for a variety of reasons. Liquid phase recovery systems using direct neutralization by calcium compounds or double alkali recovery using caustic scrubbing followed by calcium salt precipitation have resulted in the deposition of calcium fluoride in the scrubbers and eventual plugging because of the solubilization of calcium by borates.

Dry contact processes involving the sorption of acid gases on a solid reactive surface have also been unsuccessful, largely because of the need to quench the gas stream with water prior to the contact treatment. Such a quenching step is required to reduce the temperature and volume rate of the gas stream for both economy and corrosion considerations. Furthermore, the preferred mode of practicing the dry contact process for the sorption of acid gases taught in U.S. Pat. No. 3,808,774 requires a humidified gas stream. The problem with quenching gas streams containing boron oxides is that the normally solid, non-volatile oxides appear to hydrolyze to boric acid ($H_3BO_3$) in the presence of moisture. Boric acid has been found to exert a measurable vapor pressure at typical effluent gas temperatures, and this gas-phase boric acid escapes from a dry recovery system and is exhausted to the atmosphere. Moreover, it has been found that this effect is greatly enhanced in an acid environment. It is believed that boric acid forms a complex with such substances as HF. The complex is significantly more volatile than boric acid alone and is relatively immune from sorption on typical dry sorption materials. Thus, it has been found that in such systems a white plume of boric acid and acid gases forms when the treated effluent gases are emitted to the atmosphere.

OBJECTS OF THE INVENTION

Accordingly, it is a primary object of the present invention to provide a process for treating flue gases to remove acid gases, boron compounds and particulates to meet present and proposed emissions requirements.

It is specifically an object of this invention to provide a two-stage process for treating acid gas and boron-containing flue gases comprising the steps of quenching the flue gases with an alkaline solution or slurry of a basic material so as to form a substantially dry salt reaction product of the acid gas, thus minimizing the formation of the $H_3BO_3 \cdot XHF$ gaseous complex and subsequently contacting the flue gases with a particulate sorbent material for removing residual acid gases.

It is a further object of this invention to provide a synergistic and economical two-stage recovery process which achieves maximum use of alkaline materials and results in a dry salt reaction product as a recycle source of fluorides and borates or as the only waste material other than the treated gas stream.

These and other objects and advantages of this invention will become apparent from the following description.

BRIEF DESCRIPTION OF THE DRAWINGS

FIG. 1 is a flow diagram of the process of this invention.

DESCRIPTION OF THE PREFERRED EMBODIMENT

Referring more particularly to FIG. 1, the flue gases for treatment by the process of this invention, represented as stream $S_1$, are at a temperature above about 750° F, typically from about 500°–1000° F and contain HF and, perhaps, sulfur oxides as gases together with boron oxides and other particulates. Gas flow rates may vary and are limited only by the size and design of the equipment. Also, it will be appreciated that the exact nature and proportions of contaminants will vary depending on the particular industrial operation.

The flue gases $S_1$ are sprayed with or otherwise contacted with a highly dispersed solution or slurry of a basic material L prior to or simultaneously with entering a reaction chamber 10. By basic material is meant any substance which has a basic reaction with water. The most common materials of this type are the alkali and alkaline earth metal oxides, hydroxides, carbonates and bicarbonates, but the invention is not limited to these. Specifically included within the scope of this invention are: $NaOH$, $Na_2O$, $Na_2CO_3$, $NaHCO_3$, $Na_2SO_3$; $KOH$, $K_2O$, $K_2CO_3$, $KHCO_3$, $K_2SO_3$; $LiOH$, $Li_2O$, $Li_2CO_3$, $LiHCO_3$; $Ca(OH)_2$, $CaO$, $CaCO_3$; $Mg(OH)_2$, $MgO$, $MgCO_3$; $Ba(OH)_2$, $BaO$, $BaCO_3$; $Zn(OH)_2$, $ZnO$, $ZnCO_3$, $Ni(OH)_2$, $NiO$, $NiCO_3$, $Cu(OH)_2$, $CuOH$, $Fe(OH)_3$, $Fe_2O_3$, $FeCO_3$, $Fe_2(CO_3)_3$. Also included in this invention are the various natural ores and the waste ores resulting from various industrial processes which may comprise one or more of the above compounds and have a basic reaction with water. Preferred natural ores are nepheline syenite and phonolite for the reasons described hereinafter.

All of the above-mentioned alkali metal compounds, that is those of sodium, potassium and lithium, are very soluble in water and may be employed as an aqueous solution. The other basic compounds listed above range from moderately soluble in cold water to virturally insoluble. These compounds may be employed in finely-divided form as aqueous slurries. Although the solutions and slurries are typically employed at or about room temperature, in the case of a basic material of borderline solubility, it may be desirable to employ a heated solution to keep the material in solution and thereby avoid the clogging problems which may accompany the use of slurries. In instances where the incoming gas temperature is below about 250° F, particularly where the temperature is below the boiling point of water, it is desirable to superheat the solution or slurry. For example, by heating under pressure, the liquid temperature can be raised to about 1000° F to insure there is adequate heat in the reaction chamber to completely and almost instantaneously vaporize all of the liquid and to leave a dry salt reaction product. However, it is preferred, and in most industrial operations it will be the case, that the heat supplied by the gas stream itself be adequate. It will be appreciated that the solution or slurry can be added by any suitable means, such as one or more spray nozzles, positioned at a plurality of locations in the duct prior to the reaction chamber 10 or along the top and sides of the chamber to obtain a better distribution of the solution or slurry.

Upon contact between the hot gas stream and the aqueous solution or slurry, a somewhat violent reaction occurs. The water is vaporized thereby cooling the gas stream, causing great turbulence, and facilitating intimate contact between the acid gases and water vapor with subsequent nucleation and reaction with the basic material or directly with the basic material. This leads to an almost complete chemical reaction between the acid gases and the basic material with the formation of the corresponding acid salts. Under the described conditions the reaction is quite rapid and the necessary residence time of the gas in the reactor ranges from about one millisecond to not more than three seconds. The rate of addition of the solution or slurry L to the flue gases $S_1$ should be sufficient to cool the gases to about 200°–300° F, preferably about 220°–250° F, yet not be so high that there remains any residual liquid in the reaction chamber. The concentration of the basic material in the aqueous solution or slurry can, likewise, be adjusted so as to insure that: (1) there is a stoichiometric equivalent or excess of basic material in the reaction chamber at any given time; and (2) all of the water is vaporized to leave a substantially dry salt reaction product.

A proportion of the salt particles thus formed in the reaction chamber are relatively large and fall to the bottom of the chamber by action of gravity, where they can be allowed to accumulate for periodic removal. In the preferred embodiment, however, the dry salt particles are continuously removed from the reaction chamber 10 by suitable means 12 positioned at the bottom of the chamber. One such device is a rotary valve. Another proportion of the fine salt particles formed in the reaction chamber become entrained in the exit gas stream $S_2$ from which they are subsequently removed by means described hereinafter.

Depending upon the nature of the acid gas contaminants, the basic material may be selected either purely from the standpoint of availability and economy or with a view toward forming a particularly desirable salt by-product. Thus, for example, if the acid gases include a high proportion of hydrogen chloride and lime is readily available, dry calcium chloride can be formed as the by-product and sold for use as road salt and similar deicing application. Alternatively, where the acid gases include a high proportion of the more valuable fluorides, for example, it may be economically feasible to employ a different basic material in order to obtain a by-product which has specialized applications. In some cases it is possible to select the basic material so that both the basic material and the acid gases can be easily regenerated from the dry salt. For example, if a slurry of magnesium oxide or magnesium carbonate is used to quench a gas stream including a high proportion of sulfur dioxide, the magnesium sulfite formed can be decomposed and recovered as magnesium oxide and sulfur dioxide by conventional thermal treatment. The magnesium oxide can then be recycled as the basic material for the slurry. Other variations of this part of the process will be apparent to those skilled in the art and are intended to be included in the scope of this invention.

On leaving the reaction chamber, the flue gases $S_2$ are typically at a temperature of about 200°–300° F, humidified, and a major portion of acid gases, typically from about 70–90%, have been removed. The concentration of residual acid gases may range from about 30–300 ppm. It has also surprisingly been found that the alkaline quenching process as described above substantially suppresses the volatilization of boron. It is believed that this is largely the result of substantially reducing the concentration of acid in the gas stream thereby inhibiting the formation of volatile boron-acid complexes. Another important factor is the reduction of the temperature of the gas stream to between 200° and 300° F, preferably about 220°–250° F. As discussed above, any attempt to cool the gas stream below about 200° F in the reaction chamber would necessitate supplying additional heat in the form of a superheated solution or slurry to obtain a substantially dry salt reaction product, and this is usually not economically feasible. On the other hand, it has been found that at gas stream temperatures above about 300° F there is significant volatilization of boric acid even at low concentrations of acid gases.

Gas stream $S_2$ is directed through a conduit downstream to a mixing area 20 where it is mixed with a particulate material capable of sorbing the residual acid gases or other gaseous contaminants. Such processes, for example, are taught by U.S. Pat. Nos. 3,721,066; 3,808,774; and 3,854,417; and the disclosures of these patents are incorporated herein by reference. Although described herein as an "area" for purposes of discussion, mixing area 20 need not be a definable structure per se. The particulate material may be blown or otherwise introduced into the gas stream at one or more points along the conduit downstream from reaction chamber 10 in an amount sufficient to sorb the residual acid gases. A preferred means of adding the particulate material, as shown in FIG. 1, is by gradually feeding it from a container into a side conduit and there mixing it with ambient air to suspend the particles. The mixed particle-air stream is then directed into the throat of a venturi (not shown) installed in the gas conduit downstream of reaction chamber 10. This also has the effect of further cooling the gas stream. It has been found particularly desirable to cool the gas stream to below about 185° F at this point to minimize downstream vaporization of boric acid.

In the preferred practice of this invention, the particulate sorbent material introduced to gas stream $S_2$ at mixing area 20 is nepheline syenite or phonolite in the manner described by U.S. Pat. No. 3,808,774. In particular, U.S. Pat. No. 3,808,774 describes a process for the abatement of acid gas emissions on the order of 50–500 ppm. from a hot effluent gas stream by the steps of: (1) quenching the gas stream with an aqueous liquid to cool and humidify it; (2) introducing to the gas stream particulate nepheline syenite having a particle size of about 5–20 microns to sorb both moisture and acid gases; and, (3) directing the gas stream bearing the nepheline syenite particles into a baghouse filter to remove the particulates together with the moisture and acid gases sorbed thereon.

As noted above, the gas stream $S_2$ leaving reaction chamber 10 is typically at a temperature of about 200°–300° F and humidified and the residual acid gas content is generally on the order of 30–300 ppm. Thus, the gas stream is ideally suited for the practice of the aforementioned process. In accordance with that process, the humid gas stream is operative to wet the particulate nepheline syenite and thereby activate it to promote the selective sorption of acid gases. The activation and sorption occurs quite rapidly and is ideally completed by the time the gas stream $S_3$, which includes entrained nepheline syenite, reaches the particle separation means. The rate of activation of nepheline syenite appears to be at least in part dependent on the relative humidity of the gas stream; and, at a relative humidity of 20–30% or higher, the activation time is on the order of one millisecond. Although the nepheline syenite activation time can be reduced still further at higher relative humidities, ordinarily the amount of water introduced into the gas stream in chamber 10 is controlled so that the relative humidity of the stream $S_2$ does not exceed about 50%. The reason for this is that at higher relative humidities some clogging of the entrained particulates tends to occur along the flowpath and particularly in the baghouse filter. Once activated, particulate nepheline syenite sorbs acid gases from the gas stream in about 0.01–3.0 seconds.

This method of abating residual acid gas emissions has been found to be up to 90% effective as well as economical in removing acid gases present at concentrations of about 50–500 ppm. Because this sorption process is essentially a surface phenomenon, only a comparatively small portion of the total particulate material on the order of 7–15 wt.-% is actively used. Thus, it is generally not economical to employ this process at higher concentrations of acid gases. The fact that only a portion of the alkali content of the particulate material is available for sorption of acid gases must be taken into account in calculating the rate of addition of the particulate material necessary for approximately a stoichiometric equivalence based on the concentration of residual acid gases and flow rate of the gas stream. However, by first employing the quenching-reaction step, which utilizes essentially all of the basic material, to remove a major portion of the acid gases, the more selective and efficient sorption step becomes economical for cleaning up acid gas residuals. The overall effectiveness of the first stage, the reaction chamber-quenching process, and the second stage, the introduction of particulate nepheline syenite or similar material, in abating acid gas emissions is from about 95–99%.

A preferred means of separating the particulate matter from the gas stream $S_3$ is the use of a baghouse filter 30 as described in the aforementioned U.S. Pat. No. 3,808,774. In one embodiment the baghouse may be pre-coated with nepheline syenite before the arrival of the gas stream. In another embodiment, the nepheline syenite coats the inside of the baghouse as it arrives there with the gas stream. The fact that residual acid gases and some moisture are removed from the gas stream due to sorption by the particulate material prior to reaching the baghouse filter means that corrosion of the filter is minimized. The reduction of moisture in the gas stream at this point is also important in reducing fogging or misting conditions near the gas stream outlet and in minimizing the hydrolyzation of boron compounds to boric acid. Moreover, the baghouse filter 30 removes not only the particulate nepheline syenite or similar material with moisture and acid gases sorbed thereon, but also removes the entrained salt particles from the first stage treatment and other particles, including boron compounds, which were initially present in the effluent gas. The reduction in the temperature of the gas stream to below about 185° F, preferably to about 165°–184° F, at this point is important in minimizing the volatility of boric acid deposited in the bag filter. On the other hand, it is not desirable to cool the gas stream below about 150° F at this point because as the dry bulb temperature of the gas stream begins to approach the dew point, typically about 130° F, moisture condenses from the gas and creates clogging in the bag filter. On leaving the baghouse the exit stream $S_4$ generally will be ready for venting to the atmosphere. The solids collected in the baghouse may be periodically removed and used in the manner hereinafter described.

As previously noted, the nepheline syenite, phonolite or similar material employed in the sorption step may also be used as the basic material for the quenching step. Because only a portion of the alkali content of the ore has been used in the sorption step, the spent ore recovered from the baghouse may also be added to the slurry of basic material for the quenching step. Furthermore, in a glass-making operation, the substantially dry salt by-products recovered from the reaction chamber may be recycled directly into the glass-making furnaces. The high temperature in the furnaces promotes the decomposition of the ore-acid gas reaction product thereby regenerating the ore and the acid as raw materials for the glass-making operation.

The following examples further illustrate the present invention.

EXAMPLES

An apparatus similar to that shown in FIG. 1 was set up to treat flue gases from the recuperator stack of a fiberglass furnace. The flue gases contained HF and particulates which included boron compounds. Tests were run to compare the removal efficiency of a water quench with that of an alkaline slurry quench. The ranges of contaminants at the system inlet and the target for emissions outlet were as follows:

| Contaminant | Average Inlet | Target Outlet |
| --- | --- | --- |
| Particulates (gr./sdcf)* | 0.1–0.3 | <0.015 |
| Fluoride (PPM) | 40–80 | <2.0 |
| Boron (lbs./hr.) | 0.3–0.8 | <0.05 |

*grains/standard dry cubic foot

The quench liquid consisted essentially of about 35 lbs./hr. of lime in the form of about a 3.5% aqueous slurry. The sorbent material for the second step of the process consisted essentially of particulate nepheline syenite blown into the gas stream at the rate of about 40 lbs./hr. The results are shown in Table 1 below.

Runs Nos. 1–3 represent tests conducted with a water quench. Except for run No. 2 where the outlet fluoride concentration was within the target outlet, all of the water quench results were unsatisfactory as to particulates, fluoride and boron emissions.

Runs Nos. 4–6 represent tests conducted according to the process of this invention, that is employing an alkaline slurry quench to cool the gas stream to between 200°–300° F followed by the addition of air and a particulate sorbent to further cool the gas to below about 185° F. All of these results were satisfactory as to particulates, fluoride and boron emissions.

Finally, runs Nos. 7 and 8 were to illustrate the importance of cooling the gas stream to below about 185° F prior to its reaching the baghouse. Runs Nos. 4 and 5 illustrate that at a baghouse temperature of 170° F target outlet emissions are easily met. Run No. 6 illustrates that at a baghouse temperature of 175° F target outlet emissions are still met. In runs Nos. 7 and 8, the baghouse temperature was increased to 200° F with the surprising result that fluoride requirements were not met. It should be noted, however, that the fluoride outlet for these runs is still substantially better than for run No. 3, a water-quench process at a baghouse temperature of 200° F.

to further cool the effluent gases to about 150°–185° F.; and,
  b. separating the mixture of effluent gases and particulate material by filter means.
2. The process of claim 1 wherein said aqueous solution or slurry consists essentially of lime slurry.
3. The process of claim 1 wherein said quenching step reduces the gas stream temperature to about 220°–250° F.
4. The process of claim 1 wherein said gas stream is further cooled to about 165°–185° F.
5. The process of claim 1 wherein said particulate sorbent material consists essentially of nepheline syenite or phonolite and the spent sorbent material is separated from said gas stream by means of a baghouse.
6. The process of claim 5 wherein said separated spent sorbent material is added to said aqueous solu-

TABLE 1

| Run No. | Inlet Duct Temp.-° F | Flue Gas Volume (scfm at 70° F) | Quench Temp.- ° F | Baghouse Temp.- ° F | Particulates gr/sdcf | Fluorides PPM | Boron lb./hr. | Quench Liquid |
|---|---|---|---|---|---|---|---|---|
|   |     |      |     |     | Target <0.015 | Target <2.0 | Target <0.050 |   |
| 1 | 540 | 6467 | 275 | 170 | 0.038 | 5.8  | 0.350 | Water |
| 2 | 400 | 6416 | 240 | 170 | 0.047 | 1.7  | 0.240 | Water |
| 3 | 535 | 5963 | 290 | 175 | 0.037 | 9.6  | 0.130 | Water |
| 4 | 700 | 4650 | 240 | 170 | 0.008 | 1.02 | 0.015 | Lime Slurry |
| 5 | 650 | 5945 | 240 | 170 | 0.006 | 1.02 | 0.020 | Lime Slurry |
| 6 | 720 | 4469 | 260 | 175 | 0.009 | 1.13 | 0.040 | Lime Slurry |
| 7 | 725 | 6814 | 285 | 200 | 0.057 | 4.9  | 0.470 | Lime Slurry |
| 8 | 635 | 6641 | 285 | 200 | 0.044 | 6.6  | 0.730 | Lime Slurry |

Having described the invention, what is claimed is:

1. A process for treating effluent gases having a temperature above about 500° F. and initially containing hydrogen fluoride and boron oxides to reduce the concentrations of hydrogen fluoride and boron oxides to environmentally required levels, comprising the following steps:
  1. First treating the effluent gases to remove a predominant portion of the hydrogen fluoride by the steps of:
    a. spraying into said effluent gases an aqueous solution or slurry of a basic material selected from the group consisting of: the oxides, hydroxides, carbonates and bicarbonates of the alkali metals, alkaline earth metals, zinc, nickel, copper and iron; nepheline syenite and phonolite; and mixtures thereof;
    b. adjusting the concentration of basic material in said solution or slurry and the rate of addition of solution or slurry such that about 70–90% of the hydrogen fluoride initially present reacts with said basic material to form a solid salt reaction product and the hot effluent gases rapidly evaporate substantially all of the liquid water thereby cooling the effluent gases to a temperature of about 200°–300° F. and humidifying the gases to a relative humidity of about 20–50%; and,
    c. separating the larger solid salt particles from the effluent gases by gravity;
  2. Thereafter further treating the effluent gases for the removal of residual hydrogen fluoride and solid particles including boron oxides by the steps of:
    a. contacting the effluent gases with an ambient air suspension of particulate sorbent material selected from nepheline syenite, phonolite and mixtures thereof to sorb residual hydrogen fluordie to environmentally acceptable levels and tion or slurry as at least a portion of the basic material therefor.

7. The process of claim 5 wherein said baghouse is pre-coated with particulate sorbent material prior to the arrival of said gas stream.

8. A process for treating effluent gases having a temperature from about 400°–725° F. and initially containing about 40–80 ppm. hydrogen fluoride and about 0.3–0.8 lbs./hr. of boron oxides to reduce the concentrations of hydrogen fluoride to about 2 ppm. or less and to reduce the concentration of boron oxides to about 0.05 lbs./hr. or less comprising the following steps:
  1. First treating the effluent gases to remove a predominant portion of the hydrogen fluoride by the steps of:
    a. spraying into said effluent gases an aqueous solution or slurry of a basic material selected from the group consisting of: the oxides, hydroxides, carbonates and bicarbonates of the alkali metals, alkaline earth metals, zinc, nickel, copper and iron; nepheline syenite and phonolite; and mixtures thereof;
    b. adjusting the concentration of basic material in said solution or slurry and the rate of addition of solution such that about 70–90% of the hydrogen fluoride initially present reacts with said basic material to form a solid salt reaction product and the hot effluent gases rapidly evaporate substantially all of the liquid water thereby cooling the effluent gases to a temperature of about 240°–290° F. and humidifying the gases to a relative humidity of about 20–50%; and,
    c. separating the larger solid salt particles from the effluent gases by gravity;

2. Thereafter further treating the effluent gases for the removal of residual hydrogen fluoride and solid particles including boron oxides by the steps of:
   a. mixing the effluent gases with an ambient air suspension of particulate nepheline syenite to sorb residual hydrogen fluoride to about 2 ppm. or less and to further cool the effluent gases to about 170°–175° F.; and,
   b. separating the mixture of effluent gases and particulate material by means of a baghouse filter.

9. The process of claim 8 wherein said aqueous solution or slurry of a basic material comprises lime in the form of about a 3.5% slurry.

* * * * *